(12) United States Patent
Schade et al.

(10) Patent No.: US 10,557,969 B2
(45) Date of Patent: Feb. 11, 2020

(54) OPTICAL COMPONENT, SENSOR AND METHOD FOR MEASURING AN EXPANSION AND/OR A TEMPERATURE

(71) Applicant: Fraunhofer-Gesellschaft zur Förderung der angewandten Forschung e.V., Munich (DE)

(72) Inventors: Wolfgang Schade, Goslar (DE); Michael Köhring, Bad Sachsa (DE); Konrad Bethmann, Hemmingen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 15/709,660

(22) Filed: Sep. 20, 2017

(65) Prior Publication Data
US 2018/0081081 A1 Mar. 22, 2018

(30) Foreign Application Priority Data

Sep. 21, 2016 (DE) .................. 10 2016 218 067

(51) Int. Cl.
*G02B 1/00* (2006.01)
*G01D 5/353* (2006.01)
(Continued)

(52) U.S. Cl.
CPC ............ *G02B 1/002* (2013.01); *G01D 5/3537* (2013.01); *G01D 5/35341* (2013.01); *G02B 6/36* (2013.01); *G02F 1/0018* (2013.01)

(58) Field of Classification Search
CPC .......... G02B 1/002; G02B 6/26; G02F 1/0018; G01D 5/3537; G01D 5/35341
(Continued)

(56) References Cited

U.S. PATENT DOCUMENTS

2005/0117866 A1 6/2005 Park et al.
2009/0323014 A1 12/2009 Cunningham et al.
(Continued)

FOREIGN PATENT DOCUMENTS

DE 102016218067 B3 * 7/2017 ............ G01B 11/16
WO WO 2004/017111 A1 2/2004

OTHER PUBLICATIONS

Yi Yang et al., "Photonic crystal stress sensor with high sensitivity in double directions based on shoulder-coupled aslant nanocavity," Sensors and Actuators A: Physical, 0924-4247/S, dated Jan. 29, 2013, pp. 149-154, vol. 193, published by Elsevier, Beijing, China.
(Continued)

*Primary Examiner* — David P Porta
*Assistant Examiner* — Gisselle M Gutierrez
(74) *Attorney, Agent, or Firm* — Brinks Gilson & Lione

(57) ABSTRACT

An optical component may be provided having a substrate with a first refractive index, in which space regions with a second refractive index are arranged, wherein the optical component contains at least one optical metamaterial, which contains a plurality of individual pixels each comprising a space region which has the first or the second refractive index, wherein the substrate contains at least one polymer. Further, a sensor may be provided with such an optical component and a process for measuring any of an expansion or a temperature.

22 Claims, 5 Drawing Sheets

(51) Int. Cl.
*G02B 6/36* (2006.01)
*G02F 1/00* (2006.01)

(58) Field of Classification Search
USPC .......................................... 250/459.1, 458.1
See application file for complete search history.

(56) References Cited

U.S. PATENT DOCUMENTS

| 2010/0290503 A1 | 11/2010 | Rumpf, Jr. et al. |
| 2012/0057616 A1 | 3/2012 | Padilla et al. |
| 2014/0319378 A1* | 10/2014 | Van Steenberge ......................... G01N 21/6428 250/459.1 |

OTHER PUBLICATIONS

"OrmoCore and OrmoClad," dated 2015, micro resist technology GmbH, Berlin, Germany.
Jesse Lu et al., "Nanophotonic Computational Design," Optics Express, dated Jun. 3, 2013, p. 13351, vol. 21, Issue 11, Optical Society of America, United States.
Bing Shen et al., "An integrated-nanophotonics polarization beamsplitter with 2.4 × 2.4 $\mu m^2$ footprint," Nature Photonics, dated Jun. 2015, pp. 378-382, vol. 9, Springer Nature.

* cited by examiner

OPTICAL COMPONENT, SENSOR AND METHOD FOR MEASURING AN EXPANSION AND/OR A TEMPERATURE

CROSS REFERENCE TO RELATED APPLICATIONS

This application claims priority under 35 USC § 119(a) to German patent application DE 10 2016 218 067.3 filed Sep. 21, 2016.

DETAILED DESCRIPTION

Figure 1:
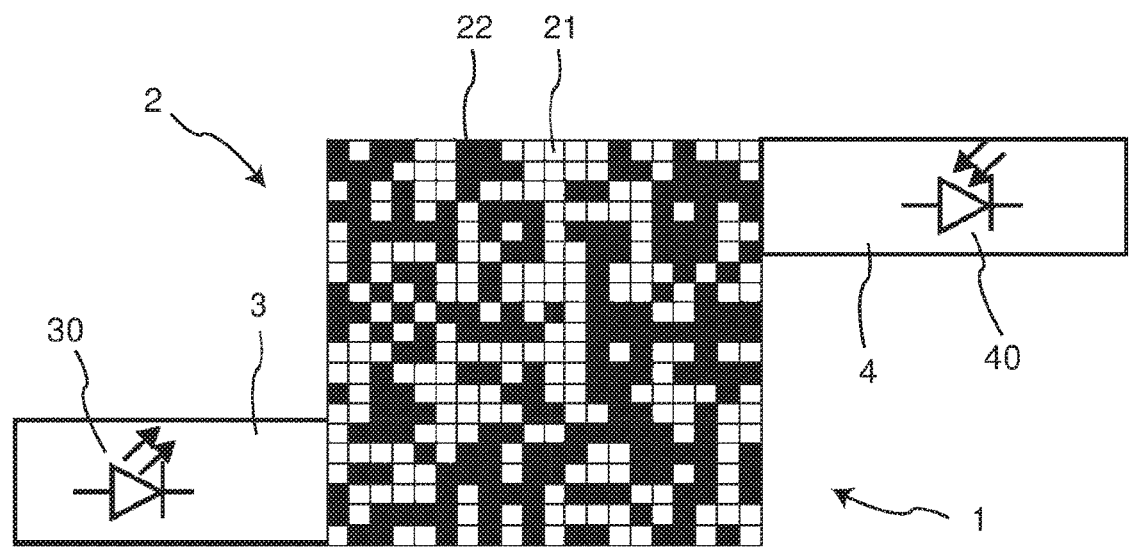
FIG. 1 shows a schematic diagram of an optical component according to the invention in a first embodiment.

The invention relates to an optical component having a substrate with a first refractive index, in which space regions with a second refractive index are developed, wherein the optical component contains at least one optical metamaterial containing a plurality of individual pixels which comprise in each case one space region that has the first or second refractive index. Furthermore, the invention relates to an optical sensor which contains at least one of the above described optical components. Finally, the invention relates to a method for measuring an expansion and/or a temperature with at least one optical component containing a substrate, on which space regions with a second refractive index are developed. Devices and methods of the above mentioned type can be used as couplers in the optical communication engineering or as an optical strain gage for detecting a temperature and/or a load.

B. Shen, P. Wang, R. Polson, R. Menon, Nature Photon. 9, 378-382 (2015) disclose an optical metamaterial of the above mentioned type. This metamaterial is produced by means of conventional lithographic methods known from the semiconductor manufacture. However, this known material has the drawback that silicon is energetically complex in manufacture. Furthermore, the possible uses of silicon components are limited since said components are brittle and break easily.

US 2012/0057616 A1 discloses a bolometer which is composed of a composite body array arranged of a dielectric substrate, said composite bodies containing metamaterials. The substrate can contain a polymer.

Proceeding from the prior art, the object of the invention is to provide an optical component which opens new possible uses and/or renders possible a more reliable operation and/or which can be produced more easily and in a more cost-effective way.

The invention proposes an integrated optical component on a substrate. The substrate has a first refractive index which is a material constant of the material used for the substrate.

The material of the substrate is changed in part by point-to-point exposure using a short-pulse laser, by exposure using a mask, by doping or by other methods known in principle so as to develop space regions which have a second refractive index. As a result, functional areas can be produced on and/or in the substrate, such as waveguides, couplers, interferometers or other optical components known in principle.

The optical component according to the invention contains at least one region in which an optical metamaterial is developed. For the purposes of the present description, a metamaterial is understood to mean materials which contain an artificially produced structure, the electrical permittivity and the magnetic permeability of which differ from the values common in nature. This is achieved by periodic, small structures which are developed in the interior of the metamaterial. In the present case, the metamaterial contains a plurality of individual pixels comprising, in each case one space region that includes the first or second refractive index. The pixels can be arranged periodically so as to lead to a kind of checkerboard pattern in which pixels of one and the other refractive indexes are arranged alternately, wherein the pixel sequence is shifted by one period in the underlying lines. In other embodiments of the invention, the pixels can be arranged in a way similar to an optical QR code in a predeterminable pattern arbitrary at first sight, which results in a desired, predeterminable effect of the metamaterial on optical signals.

The invention now proposes that the substrate contain at least one polymer or consist of a polymer. On the one hand, this renders possible a simpler and more cost-effective production of the optical component, e.g. by point-to-point exposure using a short-pulse laser. In some embodiments of the invention, the short pulse laser can emit pulses of less than 1 ns, less than 100 fs or less than 10 fs. In other embodiments of the invention, thermal effects can be produced in the material of the substrate by means of laser radiation, thus changing the refractive index. In yet other embodiments of the invention, the polymer of the substrate can be removed in part by masking and etching and can be replaced with another material, e.g. a second polymer. As a result, optical components known in principle, such as waveguides, couplers or interferometers, can be developed in the substrate. In at least one partial area and/or one partial volume of the substrate it is possible to additionally produce the metamaterial according to the invention, in which individual pixels are developed in the above described, desired sequence.

The optical component according to the invention additionally has the advantage that the substrate has a larger thermal expansion as compared to silicon. As a result, certain, predeterminable properties of the metamaterials can change, such that the optical component can be used for measuring a temperature. In yet other embodiments of the invention, the substrate can be mounted on a mechanical component and/or a mechanical member, such that a length variation of the member also causes a length variation of the substrate in at least one direction. This can also change predeterminable properties of the metamaterial and, as a result, the optical component according to the invention can be used as a sensor for measuring the deformation and thus indirectly also for measuring an affecting load and/or force. Finally, a plurality of metamaterials can be integrated on one substrate so as to detect different loads and/or different load directions or determine temperature and affecting load independently of one another.

In some embodiments of the invention, the length and/or width and/or the height of a pixel can be smaller than the wavelength of the optical signals, for the operation of which the optical component is set up. It is thus ensured that the optical properties of the metamaterial can be adjusted within wide limits. As a result, the optical signal can be focused or reflected as in conventional optical devices and also be expanded or distorted or be manipulated in other ways.

In some embodiments of the invention, the width and/or the length of a pixel can be between about 50 nm and about 800 nm or between about 200 nm and about 400 nm. In some embodiments of the invention, the height of a pixel can be between about 0.5 µm and about 5 µm. This allows the operation of the optical component with visible light or with infrared radiation. In particular, this renders possible an operation of the optical component at the wavelengths common in telecommunication, such that reliable and cost-effective light sources and detectors are available.

In some embodiments of the invention, the pixels of the metamaterial can be arranged in an array. This allows a simple manufacture and a discrete calculation of the metamaterial so as to manipulate incident electromagnetic radiation and/or optical signals in a precisely defined way.

In some embodiments of the invention, the array can have in every direction in space between about 10 and about 1000 or between about 10 and about 200 or between about 100 and about 1000 or between about 150 and about 800 or between about 50 and about 500 pixels. Metamaterials of this size can be easily produced, on the one hand, well integrated in optical components and be suitable to exert an adequate effect on incident electromagnetic radiation.

In some embodiments of the invention, the first refractive index can be between about 1.0 and about 1.6. In some embodiments of the invention, the second refractive index can be between about 1.4 and about 1.9, wherein the second refractive index is larger than the first refractive index. Therefore, the difference between the refractive indexes is large enough, on the one hand, to render possible an efficient guide of optical signals in waveguide structures and, on the other hand, to develop metamaterials which render possible the desired manipulation of the optical signals with relatively simple structures.

In some embodiments of the invention, the substrate can contain polymethyl metacrylate and/or a photoresist. Such substrates can easily be processed and, in the case of a photoresist, be produced by coating a mechanical component and/or a machine part directly on the member, the properties of which shall be determined.

In some embodiments of the invention, some of the pixels can contain a dopant and/or nanoparticles. As a result, the refractive index of the substrate material can change, so as to produce the pixels with first and second refractive indexes of the metamaterials.

In some embodiments of the invention, some of the pixels can contain titanium dioxide. Titanium dioxide as nanoparticles is easy to process, non-toxic and results in a sufficiently high change in the refractive index and, as a result, it is particularly easy to thereby produce the optical components according to the invention.

In some embodiments of the invention, a sensor according to the invention is read by coupling at least one lighting device to the sensor element by means of the input waveguide. As a result, an optical inquiry signal from a light source, e.g. a laser, a light-emitting diode or a superluminescent diode can be coupled in the metamaterial used as the sensor element.

In some embodiments of the invention, at least one detection device can be coupled to the sensor element by means of an output waveguide. For example, a spectrometer or a photodiode can be used as a detection device.

In some embodiments of the invention, a sensor according to the invention can have at least two output waveguides each of which is connected to a photodiode. The amount of cross-coupling of an optical signal supplied via an input waveguide can then be used as a measurement signal in the two output waveguides. It can easily be determined by determining the intensity relationship of the two photodiodes.

In some embodiments of the invention, an output waveguide can be a single mode waveguide and an output waveguide can be a multimode waveguide. The metamaterial used as a sensor element is designed in these cases such that a predeterminable portion of an optical input signal is cross-coupled in the single mode waveguide without the influence of a load. When the metamaterial is expanded or compressed by affecting forces and/or a temperature change, the portion of the light identified in the signal mode waveguide changes, such that the intensity ratio for determining force and/or temperature can be used.

In some embodiments of the invention, the metamaterial is designed to cross-couple between about 1% and about 20% of the light coupled in via an input waveguide to an output waveguide, wherein between about 90% and about 10% are coupled in the second output waveguide. This allows a simple measurement with good signal/noise ratio and fewer instruments needed. In some embodiments of the invention, the ratio of the intensities of the optical signals in the first and second output waveguides can be between about 1:12 and about 1:4.

In some embodiments of the invention, the lighting device used for reading can emit light having a wavelength between 500 nm, about 1000 nm. In other embodiments of the invention, the lighting device can emit light having a wavelength between about 800 nm and about 950 nm. In some embodiments of the invention, silicon photodiodes can be used as a detection device.

In some embodiments of the invention, the light can be supplied to the metamaterial used as a sensor element by means of an input waveguide, which lies in the plane defined by the metamaterial.

In other embodiments of the invention, the light of the lighting device can be supplied to the sensor element along the normal vector of the plane defined by the metamaterial. This allows a simple assembly of the light sources which can be arranged in a grid corresponding to the arrangement of a plurality of metamaterials on a second substrate which is arranged on the substrate of the component e.g. by flip chip bonding or gluing. In some embodiments, the light source can be arranged at a distance from the metamaterial and/or from the polymer substrate of the sensor and contain e.g. a laser or include an optical lens to thus stimulate the measurement signal in contactless fashion and without the use of electronic components on the measuring object.

In some embodiments of the invention, at least one output waveguide can contain a first fluorescence dye. This feature has the effect that the measurement signal can be detected without contact by means of the intensity of the fluorescence signal.

In some embodiments of the invention, at least one partial area is arranged on the substrate of the sensor or adjacent to the sensor in the detection region of the detection device, said partial area containing a second fluorescence dye. In some embodiments of the invention, the second fluorescence dye can have another fluorescence wavelength than the first fluorescence dye. Due to the measurement of the intensity of the fluorescence signal of the second fluorescence dye, the measurement signal of the output waveguide can be standardized to the incident intensity of the lighting device.

The invention shall be explained in more detail below by means of drawings without restricting the general inventive concept, wherein:

FIG. 1 shows a schematic diagram of an optical component according to the invention in a first embodiment.

Figure 2:
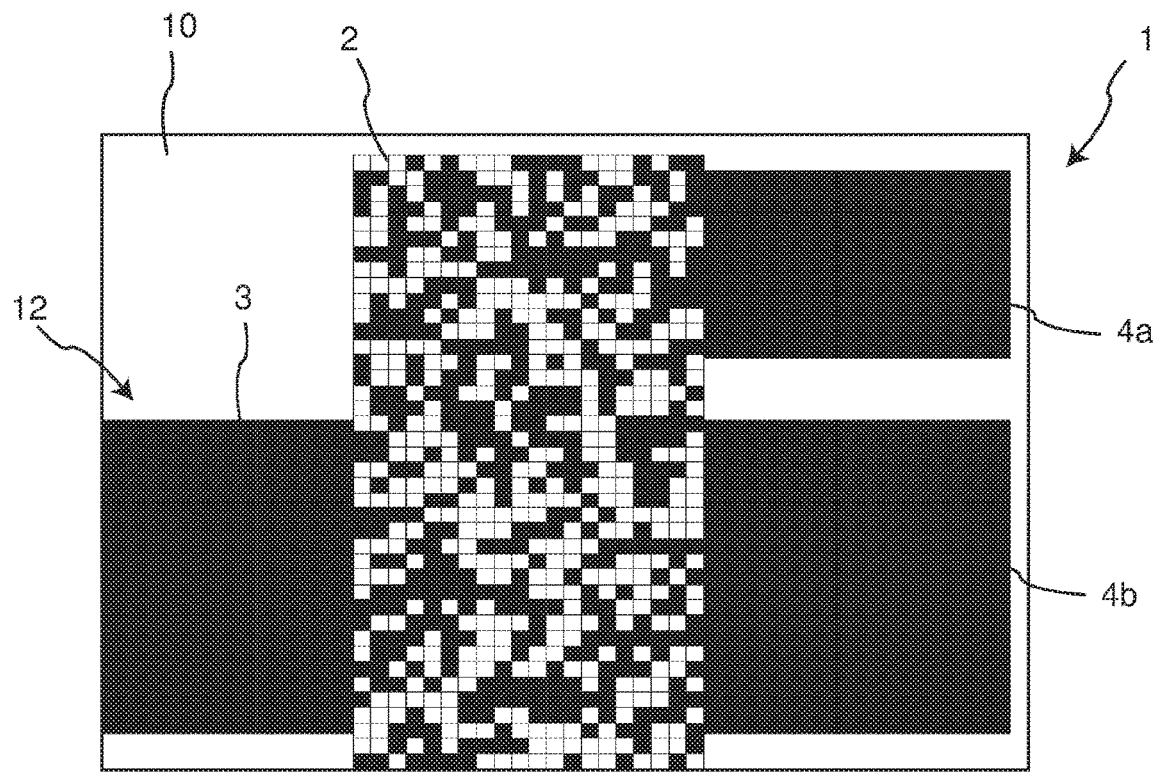
FIG. 2 shows a schematic diagram of an optical component according to the invention in a second embodiment.

FIG. 2 shows a schematic diagram of an optical component according to the invention in a second embodiment.

Figure 3:
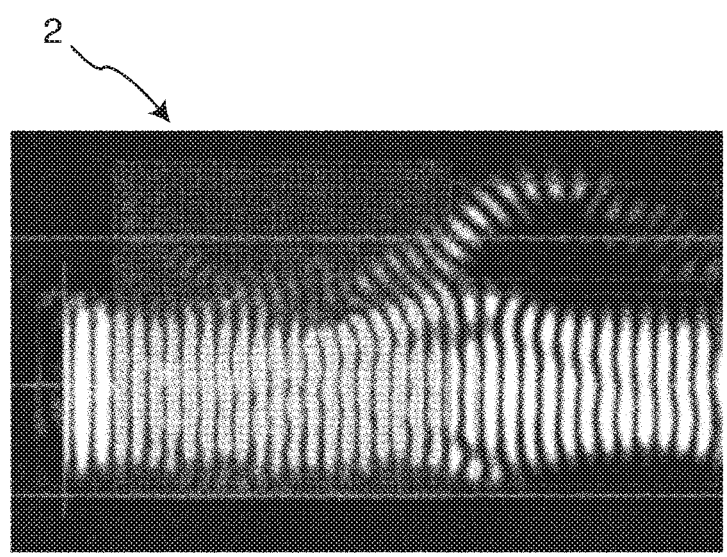
FIG. 3 shows simulation results of the behavior of the optical component according to the second embodiment.

FIG. 3 shows simulation results of the behavior of the optical component according to the second embodiment.

Figure 4:
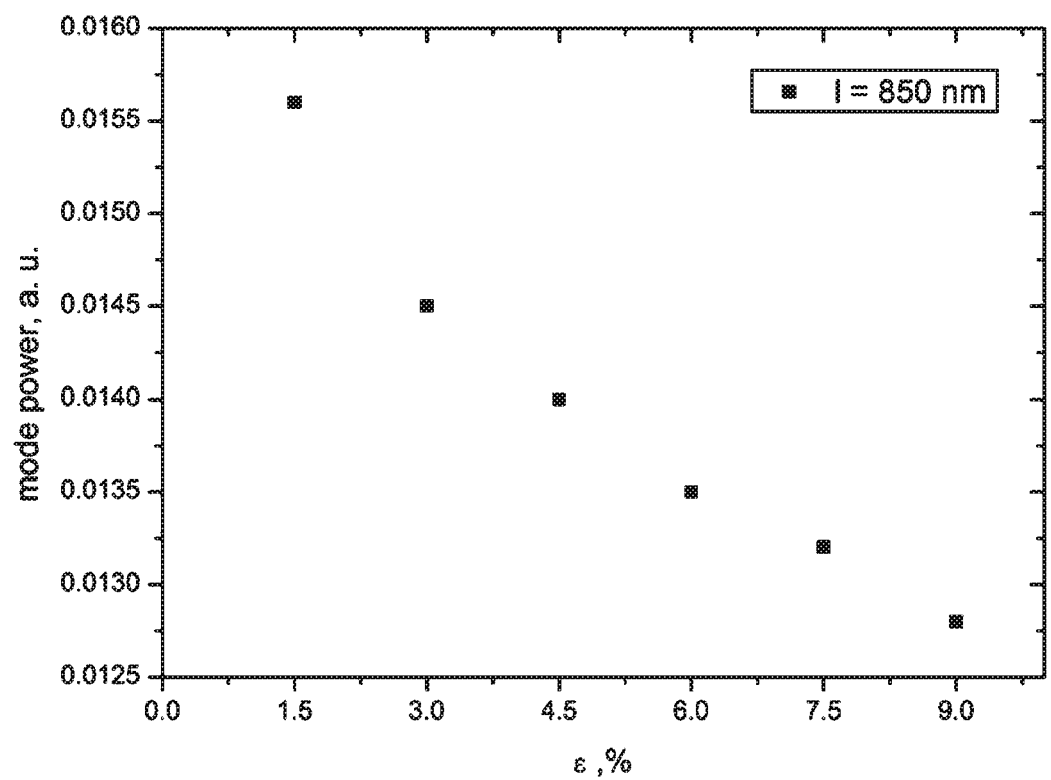
FIG. 4 shows the dependence of the intensity ratio in the output waveguides in the case of a horizontal extension of the optical component according to FIG. 2.

FIG. 4 shows the dependence of the intensity ratio in the output waveguides in the case of a horizontal extension of the optical component according to FIG. 2.

Figure 5:
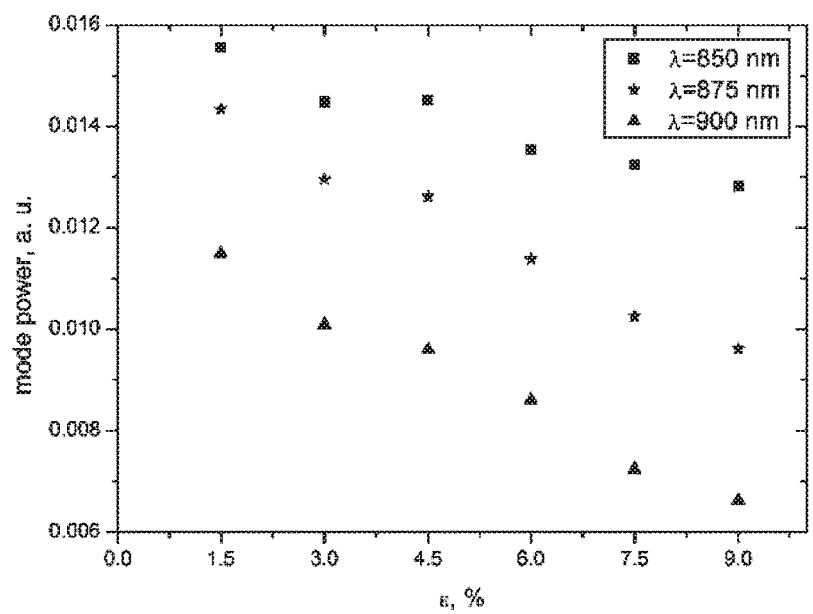
FIG. 5 shows the wavelength dependence of the intensity ratio in the output waveguides in the case of horizontal extension.

FIG. 5 shows the wavelength dependence of the intensity ratio in the output waveguides in the case of horizontal extension.

Figure 6:
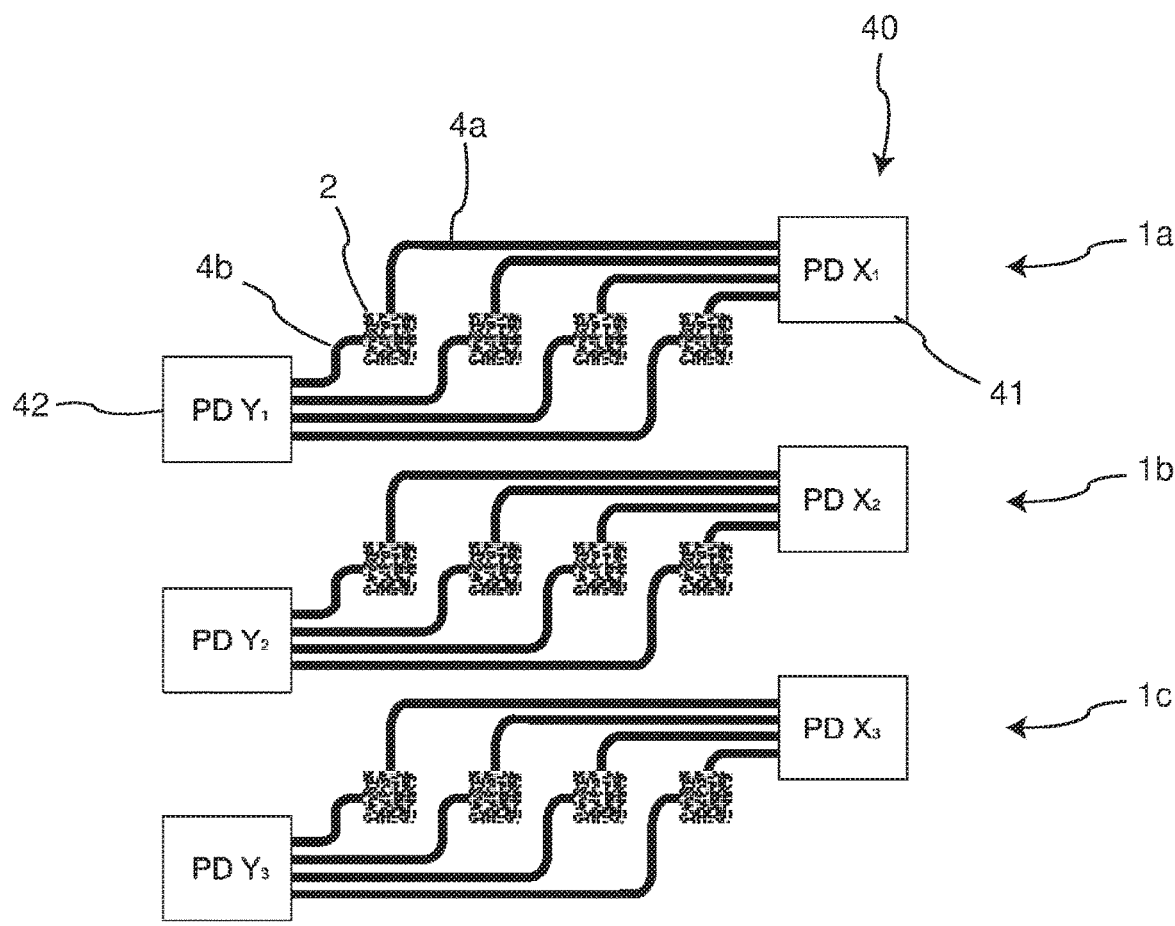
FIG. 6 shows an expansion sensor according to a first embodiment of the invention.

FIG. 6 shows an expansion sensor according to a first embodiment of the invention.

Figure 7:
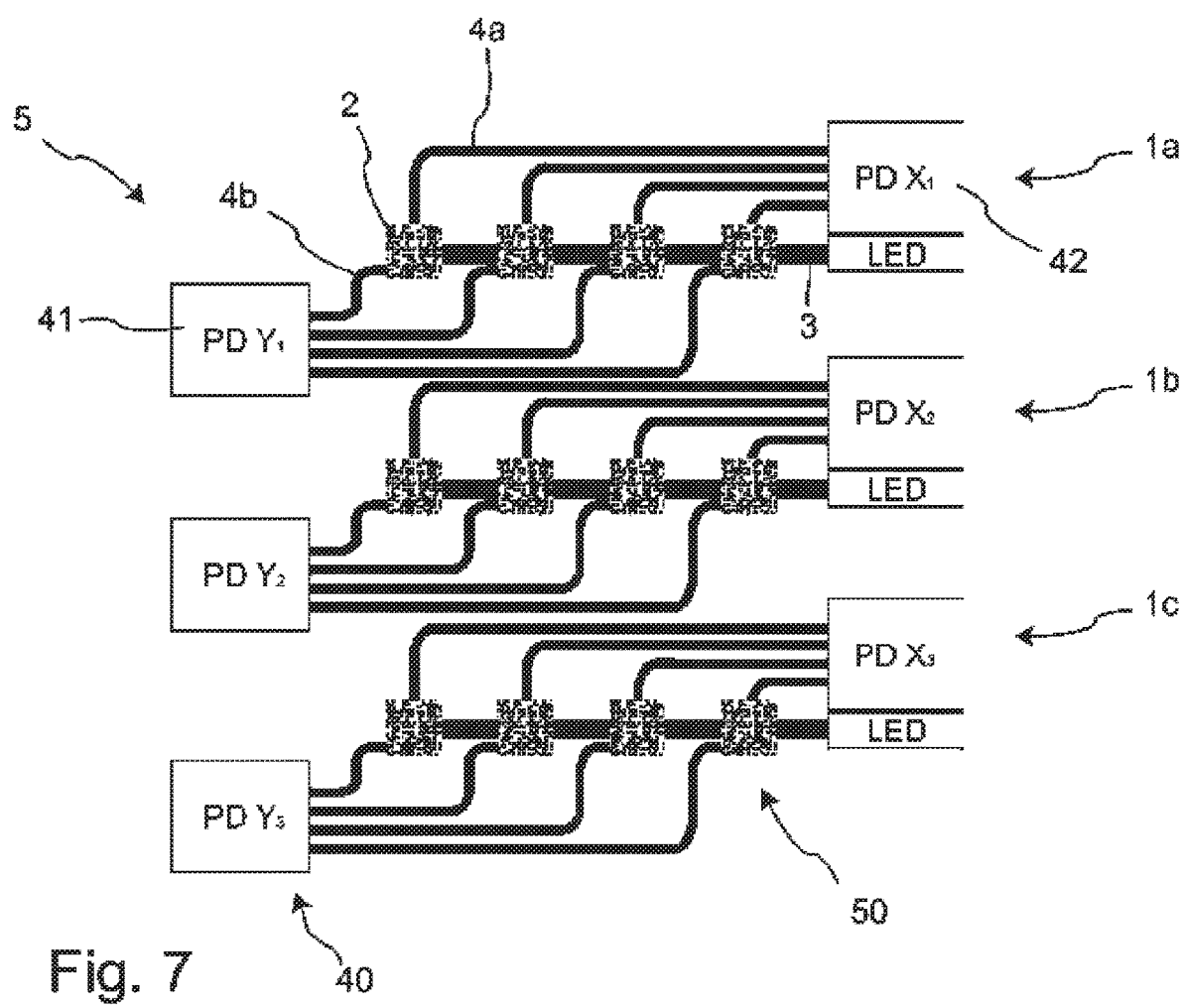
FIG. 7 shows an expansion sensor according to a second embodiment of the invention.

FIG. 7 shows an expansion sensor according to a second embodiment of the invention.

Figure 8:
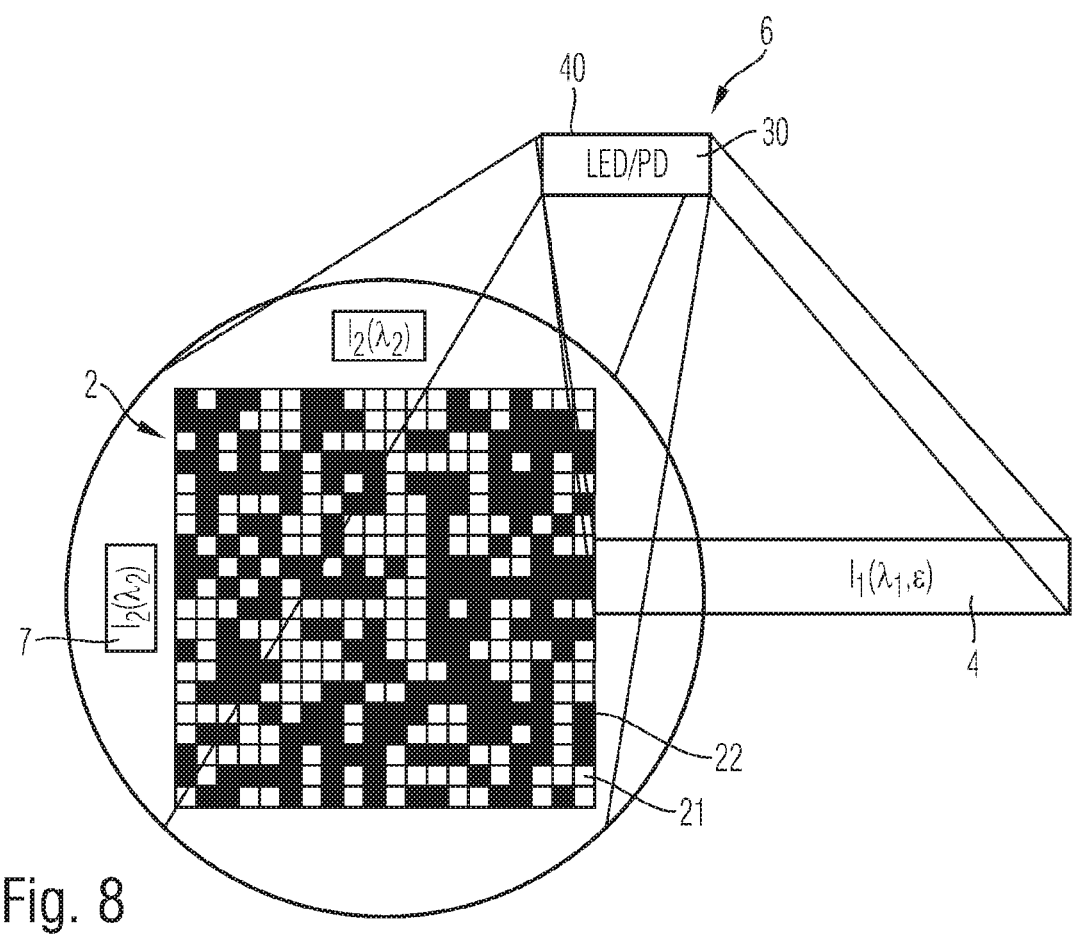
FIG. 8 shows an expansion sensor according to a third embodiment of the invention.

FIG. 8 shows an expansion sensor according to a third embodiment of the invention.

In a first embodiment, FIG. 1 shows an optical component 1 according to the present invention. The optical component 1 can be arranged e.g. on a substrate 10. The substrate 10 contains according to the invention a polymer. For example, a film and/or a plate of a polymer can be used as a substrate. The polymer can contain or consist of e.g. polymethyl metacrylate, polyester, polycarbonate or polyethylene. The substrate can have a mono-layered, homogeneous structure or contain a plurality of layers, arranged on top of one another or superimposed, of equal or different materials. In some embodiments of the invention, the substrate can be, or contain, a polymer coating on a member. In these cases, the member as such can consist of, or contain, a metal, an alloy, a glass or a ceramic material.

The substrate has a first refractive index. By doping, material modification using laser and/or UV radiation or partially removing the material of the substrate and filling it with another material, spatial regions and/or surface areas 12, which have a second refractive index, can be developed in the substrate 10. In some embodiments of the invention, the first refractive index can be between 1.1 and about 1.6. The second refractive index can be between about 1.7 an about 1.9. Of course, other embodiments of the invention are also conceivable, in which the refractive indexes differ from said values. However, in some embodiments, a large refractive index contrast is advantageous, i.e. a correspondingly large difference between the first and second refractive indexes.

Due to a change in the refractive index, structures are formed in the substrate 10, said structures forming the optical component. The embodiment illustrated in FIG. 1 shows a digital metamaterial 2. The metamaterial 2 contains an array of individual pixels. For reasons of clarity, only 20×20 pixels are shown in FIG. 1. In other embodiments of the invention, the number of pixels can also be larger or smaller in a horizontal and/or vertical direction. Individual pixels need not be square as shown in FIG. 1. Other polygonal or round forms are also conceivable. The depth of individual pixels inside the substrate can extend over the entire material thickness of the substrate. In other embodiments, the pixels can have a smaller depth. The length and/or width shown in FIG. 1 in a horizontal direction and vertical direction can be between about 50 nm and about 800 nm in some embodiments. In general, the dimensions of a pixel will be smaller than the wavelength of optical signals which are processed by the optical component 1.

As shown in FIG. 1, the metamaterial 2 contains first pixels 21, which have a first refractive index, and second pixels 22, which have a second refractive index. First and second pixels can be arranged within the array forming the metamaterial 2 in a regular or irregular pattern. The accurate sequence of first and second pixels can be calculated e.g. in a simulation to achieve a desired behavior of the optical component 1. For example, the optical component 1 can be used as a coupler which cross-couples optical signals from one or more input waveguides to one or more output waveguides. Size, refractive indexes and arrangement of the pixels 21 and 22 within the metamaterial 2 determine here the behavior of a coupler made in this way.

In other embodiments of the invention, the metamaterial 2 can be used as a sensor for temperature and/or mechanical stress and/or strain. In this case, the influence of the metamaterial 2 on an optical input signal changes depending on the thermal expansion and/or depending on the mechanical deformation on account of a deformation of a member connected to the optical component.

FIG. 1 shows, merely by way of example, a single input waveguide 3 and a single output waveguide 4. Optical signals, e.g. infrared light, are produced by means of a lighting device 30. The lighting device 30 can comprise e.g. a light-emitting diode, a superluminescent diode or a semiconductor laser. The lighting device 30 can produce a modulated optical signal, wherein the modulation can represent data.

The optical signal coupled in the metamaterial 2 via the input waveguide 3 interacts with the first pixels 21 and the second pixels 22 and/or the boundary layers formed on the pixels 21 and 22. Due to this, interferences, intensity changes and/or phase shifts can occur.

The electromagnetic signal modified in this way is supplied to an output waveguide 4. The output waveguide 4 is connected to a schematically shown detection device 40. In some embodiments, the detection device 40 can contain at least one photodiode. In other embodiments of the invention, the detection device 40 can contain at least two photodiodes, as explained below by means of FIG. 2, FIG. 6 and FIG. 7.

In order to produce the metamaterial 2, a photoresist and/or a UV-curing lacquer can be used in some embodiments of the invention. In these cases, the lacquer layer forms the substrate and/or part of the substrate with the first refractive index. The latter can be e.g. 1.51.

The UV-curing lacquer is in part cured with a structured mask. For example, the microscope projection photolithography can be used for this purpose. Alternatively, a 2-photon photolithography, an embossing method or a direct inscription method by means of short pulse laser radiation can be used as well.

Part of the UV-curing lacquer is then removed. The thus resulting defects can be filled with a second polymer with a second refractive index. In some embodiments of the invention, the second polymer can contain a dopant, e.g. nanoparticles, which contain or consist of e.g. $TiO_2$. The second polymer can be e.g. polymethyl methacrylate. In this way, the second refractive index can be 1.81, such that there is a sufficiently large contrast with respect to the starting material.

FIG. 2 shows a second embodiment of an optical component according to the invention. The same constituents of the invention are provided with the same reference signs, such that the following description is limited to the relevant differences.

FIG. 2 also shows a substrate 10, on which a metamaterial 2 is formed. The metamaterial 2 is supplied with light via an input waveguide 3. Two output waveguides 4a and 4b are disposed on the opposite side of the metamaterial 2. The output waveguide 4a has a smaller width, such that it is a single mode waveguide. However, the waveguide 4b having a larger width is a multimode waveguide like the input waveguide 3.

The sequence of first and second pixels 21 and 22 of the metamaterial 2 is calculated in such a way that a predeterminable light intensity is coupled from an input waveguide 3 to the first output waveguide 4a. The remaining light intensity minus possible losses couples in the second output waveguide 4b.

Both the first output waveguide 4a and the second output waveguide 4b are connected to detection devices, e.g. photodiodes. Thus, the optical component 1 shown in FIG. 2 can be used as optical coupler or mode converter, which divides an input signal into two output signals. In other embodiments of the invention, the optical component 1 can be used as an expansion sensor. This is based on the finding that in the case of horizontal strain or compression of the metamaterial 2 the optical properties thereof are changed in such a way that a larger or smaller portion of the light cross-couples in the first output waveguide 4a. Thus, by determining the intensity ratio in the output waveguides 4a and 4b it is possible to suggest the expansion acting on the metamaterial 2. When further parameters of the member provided with the metamaterial 2 and/or the optical component 1 are known, the mechanical stress and/or the affecting force acting on the member can be determined. In contrast to the known piezoelectric expansion sensors, the optical measurement proposed according to the invention has a greater resistance to electromagnetic interferences and can also be used in areas endangered by explosions.

FIG. 3 shows a simulated wave field which can be formed in an optical component according to the second embodiment illustrated in FIG. 2.

FIG. 3 shows the intensity of the wave field in the form of different brightness values. FIG. 3 illustrates that an input signal penetrates the metamaterial 2 via the input waveguide 3. As a result of the metamaterial, a smaller portion between about 5% and about 15% of the intensity is coupled in the first output waveguide 4a. The remaining intensity minus possible losses is supplied to the second output waveguide 4b.

FIG. 4 shows the intensity and/or the portion of coupled-in light at the end of the first output waveguide 4a depending on the expansion. Here, the intensity of the modes coupled in the first output waveguide 4a is shown on the ordinate. The percentage expansion is found on the abscissa. The simulation was conducted by means of infrared light with a wavelength of 850 nm.

As is shown in FIG. 4, the intensity passing over to the first output waveguide drops with increasing expansion. This leads to a measurement range of small percentage expansion where the drop is disproportionate. Thus, in particular small expansions can be detected with high accuracy. From about 3%, this is followed by an almost linear range. In this measurement range, a particularly simple assessment of the measurement signals can be conducted after preceding calibration.

FIG. 5 also shows the intensity and/or the optical output of the light modes guided in the first output waveguide 4a on the ordinate against the expansion on the abscissa. Simulation results for three different wavelengths are shown, namely 850 nm, 875 nm and 900 nm.

FIG. 5 shows that with different wavelengths the absolute intensity varies in the first output waveguide 4a. Nevertheless, the intensity decreases with increasing expansion in all studied wavelengths, as a result of which light of different wavelengths can be used to carry out the desired measurements.

FIG. 6 shows a first embodiment of a sensor according to the invention for measuring mechanical stresses and/or temperatures. The sensor contains three optical components 1a, 1b and 1c, which can be arranged on a common substrate 10 which is not specified. Although merely three optical components 1 are shown as an example, the invention does not teach the use of precisely three optical components as a solution principle. The number of the optical components can rather be larger or smaller in other embodiments of the invention and be e.g. between 1 and about 20.

The same reference signs designate the same constituents of the invention, such that the following description is limited to the relevant differences.

In the illustrated embodiment, each individual optical component 1a, 1b and 1c contains four metamaterials 2, which are all contacted by associated output waveguides 4a and 4b. The output waveguides 4a and 4b connect the metamaterials 2 in each case to a photodiode array 41 and 42, which together form the detection device 40. Other than in the first and second embodiments according to FIG. 1 and FIG. 2, the output waveguides 4a and 4b are arranged on different side edges of the metamaterial 2. In this case, the use of precisely four metamaterials 2 should also merely be understood as an example. In this case, too, the invention does not teach the use of precisely four metamaterials 2 as the solution principle. The number can rather be larger or smaller and be between 1 and about 20.

The substrate having the three optical components 1a, 1b and 1c and a total of 12 metamaterials 2 can be arranged on a mechanical component, e.g. a plane load-bearing structure, a machine component, a wing of an aircraft, a car body part or other members not mentioned herein. If these components are subject to changes in form due to the influence of mechanical loads or temperature changes, the metamaterials are also deformed. This is an essential advantage of the inventive design of the metamaterials 2 on a polymer substrate. Metamaterials known to date, which were realized on silicon, cannot detect any changes in form on the other hand. A change in form of the underlying member would rather break the substrate.

As already described above, the change in the length expansion in one or both directions of the metamaterials 2 leads to a change in the intensities respectively measured in the photodiode arrays 41 and 42. The respective measured value can precisely be assigned to a metamaterial 2 and thus a measurement location by the different channels of the photodiode arrays 41 and/or 42. Deformations can thus be determined with precision via large-area members.

The optical inquiry signal used for determining the intensity and/or for determining the intensity ratio is supplied in the embodiment according to FIG. 6 along the normal vector of the plane defined by the metamaterial 2 of the control element 50. The lighting devices, e.g. light-emitting diodes, are thus located above the substrate.

FIG. 7 shows a second embodiment of a sensor according to the invention. The same constituents of the invention are provided with the same reference signs, such that the below description is limited to the relevant differences with respect to the first embodiment shown in FIG. 6.

As evident from FIG. 7, the lighting device 30 is located on or next to the substrate which accommodates the metamaterials 2. The light necessary to detect the deformation is supplied via input waveguides 3, which run in the plane defined by the metamaterial 2 of the sensor element 50. An end of the input waveguide 3 is here connected to the lighting device 30.

FIG. 8 shows an expansion sensor according to a third embodiment of the invention. The same constituents of the invention are designated by the same reference signs, such that the following description is limited to the relevant differences.

The third embodiment of the invention also contains a substrate (not shown) which contains, or consists of, a polymer. A metamaterial 2 with first pixels 21 and second pixels 22 is realized on the polymer by means of structuring, as described above, at least one partial area and/or a partial volume. Furthermore, at least one output waveguide 4 is located on the substrate. The output waveguide 4 contains a florescence dye. This fluorescence dye glows at a predeterminable fluorescence wavelength defined by the kind of the dye as soon as light of greater wavelength is guided in the output waveguide. The intensity of the fluorescence signal here scales with the intensity of the optical power guided in the output waveguide 4. Even though only a fluorescence dye is mentioned below, the invention can also be carried out with phosphorescent dyes or generally speaking with each material capable of luminescence. The term "fluorescence" in the sense of the preset description should therefore be interpreted in a correspondingly broad way.

According to the first embodiment of a sensor, specified already by means of FIG. 6, the light required for the signal generation is injected along the normal vector of the substrate and/or of the optical metamaterial 2 produced thereon. However, other than the first embodiment, the light of the lighting device 30 is supplied to the metamaterial 30 in a free beam. For this purpose, the lighting device 30 can contain a laser, in particular a semiconductor laser. Alternatively or additionally, the lighting device 30 can also have a lens and/or a lens system which focusses the light of a light source on the substrate and/or the metamaterial 2. In this case, the light source can also contain an LED, an arc lamp or another light source known in principle.

Depending on the expansion and/or compression of the metamaterial 2, a larger or smaller portion of the incident light is again coupled in the output waveguide 4. This light leads to an excitation of the fluorescence dye, such that the output waveguide 4 and/or the partial area of the output waveguide 4 provided with the dye glows at the fluorescence wavelength predetermined by the dye. The intensity of this glowing is the measurement signal.

Therefore, the measurement signal can be detected without contact in a simple way, e.g. by a camera system which displays by means of a lens or a lens system the measurement signal on a detection device which can contain e.g. an image intensifier tube, a CCD sensor, a CMOS sensor, a photodiode or a photodiode array. The third embodiment of the invention thus allows a fully contact-less detection of the measured value which can represent an expansion and/or compression of the metamaterial and thus a temperature and/or a mechanical stress.

In order to standardize the fluorescence signal of the output waveguide 4, partial areas 7 can optionally exist, which are also provided with a fluorescence dye. In some embodiments of the invention, the second fluorescence dye of the partial areas 7 can differ from the first fluorescence dye of the output waveguide 4. Thus, the output waveguide 4, on the one hand, and the partial areas 7, on the other hand, glow when excited by the identical light source with different wavelengths, such that the two fluorescence signals can easily be distinguished by wavelength multiplex methods. For this purpose, the individual pixels and/or detection regions of the detection device can be divided into subpixels which are preferably sensitive to light of either one or the other wavelength. In other embodiments of the invention, the measurement signals of the partial areas 7 and the output waveguides 4 can, alternatively or additionally, be separated spatially.

The at least one partial area 7 is arranged at a distance from the metamaterial 2, such that optical signals between the metamaterial 2 and the partial areas 7 cannot cross-couple or only to a very small extent. The intensity of the fluorescence signal of the partial area 7 is thus an amount for the light impinging on the metamaterial, such that the measurement signal in the output waveguide 4 can be standardized to the respective light intensity. Here, the accuracy of the measurement can be increased or become possible at all with a strongly fluctuating distance between the lighting device 40 and metamaterial 2.

The substrate with the metamaterial 2, the output waveguide 4 and the optional partial areas 7 can thus be designed in the third embodiment of the invention as a fully passive component without further electric and/or electronic components. Such a sensor can be produced in a cost-effective way and can be particularly resistant to environmental influences. For example, such sensors can easily be adhered to components to be monitored.

The lighting device 40 required for detecting the measured values and the detection device 30 can be combined into a common reading device 6. The reading device 6 exclusively couples in optical fashion to the sensor according to the invention, such that the monitoring of mechanical components and/or the detection of the temperature is also possible through windows, e.g. when the component to be monitored is in vacuo or in a corrosive environment. For this purpose, the reading device 6 can e.g. be made as a handheld device or be mounted on a stand. The reading-out of such a large number of sensors is thus also possible, e.g. when the components to be monitored are moved on a conveyor belt past the reading device 6. Finally, large components, e.g. membrane roofs, or elongated components, e.g. pipe systems or pipelines, can also be monitored in an easy way when the reading device 6 is mounted on an unmanned flying object, e.g. a drone, which sequentially approaches and detects a plurality of sensors. In the same way, the reading device 6 can be mounted on a vehicle which travels either on a rail running parallel to the pipe system or the pipe to be monitored is used as a rail.

Of course, the invention is not limited to the illustrated embodiments. Therefore, the above description should not be considered limiting but explanatory. The below claims are understood to mean that a feature is present in at least one embodiment of the invention. This does not exclude the presence of further features. If the claims and the above description define "first" and "second" embodiments, this designation serves to distinguish between two equal embodiments without determining an order.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

The invention claimed is:

1. An optical component comprising a substrate having a first refractive index and comprising elements having a second refractive index, wherein
   the optical component comprises at least one optical metamaterial, including a plurality of pixels, each pixel comprising a region having any of the first or the second refractive index, and wherein
   the substrate comprises at least one first polymer and said regions having the second refractive index comprise a second polymer, the first polymer being different than the second polymer.

2. The optical component of claim 1, wherein the length and/or the width and/or the height of a pixel is smaller than a wavelength of optical signals for which the optical component is designed to operate.

3. The optical component of claim 1, wherein the width and/or the length of a pixel is between about 50 nm and about 800 nm or between about 200 nm and about 400 nm and/or that the height of a pixel is between about 0.5 µm and about 5 µm.

4. The optical component of claim 1, wherein the pixels of the metamaterial are arranged in an array.

5. The optical component of claim 1, wherein an array of the pixels comprises in each direction between about 10 and about 1000 or between about 10 and about 200 or between about 100 and about 1000 or between about 150 and about 800 or between about 50 and about 500 pixels.

6. The optical component of claim 1, wherein the first refractive index is selected from about 1.0 to about 1.6 and/or the second refractive index is selected from about 1.4 and about 1.9, and wherein the second refractive index is larger than the first refractive index.

7. The optical component of claim 1, wherein the substrate comprises polymethyl methacrylate and/or a photoresist.

8. The optical component of claim 1, wherein at least one of the pixels include a dopant and/or nanoparticles or at least one of the pixels includes $TiO_2$.

9. An optical sensor comprising:
   at least one sensor element;
   at least one lighting device configured to supply light to the sensor element; and
   at least one detection device configured to analyze light emitted from the sensor element, wherein the at least one sensor element includes an optical component comprising a substrate with a first refractive index, said substrate comprising elements having a second refractive index, wherein
   the optical component comprises at least one optical metamaterial, said metamaterial comprising a plurality of individual pixels, each pixel comprising a region having either the first or the second refractive index, and wherein
   the substrate comprises at least one first polymer and said regions having the second refractive index comprise a second polymer, the first polymer being different than the second polymer.

10. The optical sensor of claim 9, wherein the at least one lighting device is coupled to the at least one sensor element by means of an input waveguide and/or wherein the at least one detection device is coupled to the at least one sensor element by means of an output waveguide.

11. The optical sensor of claim 9, wherein the at least one detection device comprises at least two photodiodes, which are coupled with associated output waveguides to the at least one sensor element.

12. The optical sensor of claim 11, wherein an output waveguide is a single mode waveguide and an output waveguide is a multimode waveguide.

13. The optical sensor of claim 9, wherein at least one output waveguide comprises a first fluorescence dye.

14. The optical sensor of claim 13, wherein at least one partial area which comprises a second fluorescence dye is arranged on the substrate of the sensor.

15. The optical sensor of claim 14, wherein the second fluorescence dye has a different fluorescence wavelength than the first fluorescence dye.

16. A method for measuring an expansion and/or a temperature by means of at least one optical component, the method comprising:
   supplying light to a metamaterial by means of at least one lighting device; and
   analyzing light emitted from the metamaterial by means of at least one detection device, wherein
   the at least one optical component comprises a substrate having a first refractive index, said substrate comprising elements having a second refractive index, and wherein the optical component comprises at least one optical metamaterial, said metamaterial including a plurality of individual pixels each comprising a region having any of the first or the second refractive index, wherein
   the substrate comprises a first polymer and said regions having the second refractive index comprise a second polymer, the first polymer being different than the second polymer.

17. The method of claim 16, wherein
   the at least one lighting device emits light with a wavelength between about 500 nm and about 1000 or
   the at least one lighting device emits light with a wavelength between about 800 nm and about 950 nm.

18. The method of claim 16, wherein the light of the at least one lighting device is guided in a plane defined by the metamaterial of the at least one optical component by means of an input waveguide.

19. The method of claim 16, wherein the light of the lighting device is supplied to the at least one optical component along the normal vector of the plane defined by the metamaterial of the at least one optical component.

20. The method of claim 16, wherein at least one output waveguide comprises a first fluorescence dye and an intensity of the fluorescence is determined by at least one detection device.

21. The method of claim 16, wherein at least one partial area is arranged in a detection area of the at least one detection device, the at least one partial area comprises a second fluorescence dye, wherein an intensity of the light of the lighting device is determined from an intensity of the fluorescence of the at least one partial area.

22. The method of claim 21, wherein separation of a fluorescence signal of the at least one partial area and of an output waveguide is conducted by wavelength multiplex and/or by spatial separation of signals in a detection direction.

* * * * *